(12) United States Patent
Hua et al.

(10) Patent No.: US 8,552,942 B2
(45) Date of Patent: Oct. 8, 2013

(54) LED DRIVE CIRCUIT FOR SCR DIMMING

(75) Inventors: Guichao Hua, Zhejiang (CN); Xinke Wu, Zhejiang (CN); Xiaoli Yao, Zhejiang (CN); Liangan Ge, Zhejiang (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 501 days.

(21) Appl. No.: 12/831,239

(22) Filed: Jul. 6, 2010

(65) Prior Publication Data
US 2011/0001766 A1 Jan. 6, 2011

(30) Foreign Application Priority Data
Jul. 6, 2009 (CN) .......................... 2009 1 0100298

(51) Int. Cl.
*G09G 3/32* (2006.01)

(52) U.S. Cl.
USPC .............................. 345/82; 345/77

(58) Field of Classification Search
USPC ........... 345/690, 76, 77, 82, 46; 315/287, 291
See application file for complete search history.

(56) References Cited

U.S. PATENT DOCUMENTS

| | | | | |
|---|---|---|---|---|
| 7,262,559 B2 * | 8/2007 | Tripathi et al. | ............... | 315/291 |
| 2004/0169477 A1 * | 9/2004 | Yanai et al. | ...................... | 315/98 |
| 2006/0038512 A1 * | 2/2006 | Tani | ............................... | 315/291 |
| 2006/0261753 A1 * | 11/2006 | Foo | ................................. | 315/291 |
| 2008/0258647 A1 * | 10/2008 | Scianna | ......................... | 315/291 |
| 2010/0123410 A1 * | 5/2010 | Tsai | ................................ | 315/287 |
| 2010/0259196 A1 * | 10/2010 | Sadwick et al. | .............. | 315/309 |

* cited by examiner

*Primary Examiner* — Chanh Nguyen
*Assistant Examiner* — Jonathan Blancha
(74) *Attorney, Agent, or Firm* — Terry M. Sanks, Esq.; Beusse Wolter Sanks Mora & Maire, P.A.

(57) ABSTRACT

A LED drive circuit for SCR dimming including an external controller configured to receive AC voltage from a power network to convert the AC voltage to an AC voltage with a lacked phase by phase controlling the voltage through a thyristor, and a LED driver that includes a bridge rectifier configured to shape the AC voltage with the lacked phase output into a unidirectional pulse DC voltage, and a phase angle detecting circuit configured to shape the AC voltage signal output with lacked phase from the external controller into a saw-tooth wave pulse signal.

19 Claims, 5 Drawing Sheets

Figure 1

(Prior Art)

LED DRIVE CIRCUIT FOR SCR DIMMING

CROSS-REFERENCE TO RELATED APPLICATIONS

This application claims priority of Chinese Patent Application No. 200910100298.2 filed Jul. 6, 2009, which is incorporated herein by reference.

TECHNICAL FIELD

The present invention generally relates to an LED drive circuit for SCR dimming. More specifically, it relates to an LED drive circuit for SCR dimming by detecting phase angle and controlling current.

BACKGROUND OF THE INVENTION

With the increasing of energy consumption, the requirements on energy saving are getting higher and higher. The illumination consumption is an important part of the energy consumption. LED illumination, as an energy saving and green illumination, will replace the traditional gas discharge lamps and the incandescent lamps. LED has the advantages of long life, high luminous efficiency, and energy saving besides which, its simplicity in driving and controlling of the LED makes it easy and flexible to adjust the illumination intensity, which is particularly suitable in the situation when we need to adjust the illumination intensity according to the different conditions. For example, in the road illumination, the plaza illumination and other outdoor or indoor illumination, when there is no need for 100% illumination intensity, dimming can save a lot of energy.

Figure 1:
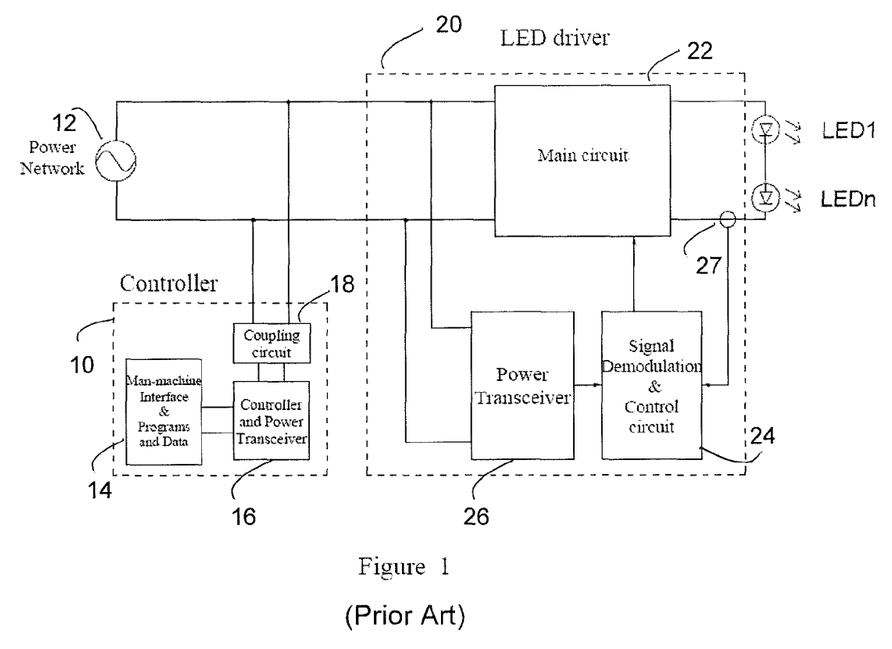
FIG. 1 is a block diagram of the LED drive circuit for dimming circuit in prior art.

Since the LED power supply is the AC/DC switching power supply with high efficiency and wide input voltage range, the traditional dimming mode such as controlling input voltage or phased angle, can not adjust the output voltage or current, and can not achieve the purpose of illumination intensity adjustment of LED. Currently, there are a variety of driving circuits for dimming. In some circuits, the automatic timing dimmer is added to the LED driver, which means the lighted LED will be dimmed after a fixed time period. This kind of dimming circuit is under the control of timing dimming circuit and built-in device for detecting illumination intensity, which can not be controlled flexibly. In some other circuits, a control circuit is added to the LED driver in order to receive the radio signal or the power line carrier signal sended by controller, and the signal is used to control the illumination intensity of LED. But the shortages of this mode are expensive cost, complex circuitry, and low reliability (shown in FIG. 1).

SUMMARY OF THE INVENTION

The present invention intends to solve the aforesaid drawbacks of the prior art by providing an LED drive circuit for SCR dimming in order to obtain a good dimming result.

To settle the drawbacks of the prior art as described above, the present invention adopts an LED drive circuit for SCR dimming which comprises an external controller and an LED driver. It has the following features:

The LED driver comprises a bridge rectifier, a main circuit, a phase angle detecting circuit and a current controlling circuit.

The external controller coverts the AC voltage from power network to AC voltage with lacked phase, by phase controlling through thyristor;

The bridge rectifier shapes the AC voltage with lacked phase output from an external controller into a unidirectional pulse DC voltage, and then feeds it to the main circuit.

The main circuit receives the pulse DC voltage signal output from bridge rectifier and the current reference signal output from current detecting circuit, and after modulated by the PWM circuit, the main circuit coverts its voltage and outputs DC voltage to LED load and current detecting signal to the current controlling circuit.

The phase angle detecting circuit is used to shape the AC voltage signal output with lacked phase from an external controller into a saw-tooth wave pulse signal, whose peak value changes according to the variation of thyristor trigger phase angle. Then the saw-tooth voltage signal is converted to a level signal, which changes in proportion to the peak variation of the saw-tooth wave pulse signal, and then outputs the level signal to the controlling current circuit as the output controlling signal from the phase angle detecting circuit.

The current controlling circuit processes the current detecting signal output (which is from the main circuit) and the controlling signal output (which is from the phase angle detecting circuit), and then outputs a current reference signal to the main circuit to control and adjust the current. Thereby, the main circuit can control the constant current and adjust the output current, which makes it possible to regulate the output current and adjust the illumination intensity of LED.

The thyristor trigger angle phase is detected by the phase angle detecting circuit and the controlling current circuit, while the illumination intensity of the LED light changes with the phase. The LED light will be brightest when the thyristor trigger angle is smallest, and the LED light will be darkest when the thyristor trigger angle is biggest. With the increasing thristor trigger angle, the peak of the saw-tooth wave and the level signal will increase, which will be fed back by the current controlling circuit to the main circuit, whose output current will be reduced, and the LED light will start to dim, and vice versa. When the thyristor trigger phase angle is increased to a certain maximum angle, the output current of the main circuit is reduced to zero. Thus, the LED light goes out.

As the present invention adopts an LED drive circuit for SCR dimming, the phase angle detecting circuit and the controlling current circuit are ideal for all applications where an LED drive circuit for SCR dimming is employed. Whenever the external controller of the front-end dimming circuit sends out a dimming signal, the phase angle detecting circuit can detect the signal, and the current controlling circuit can adjust the output current according to the signal by the main circuit. The illumination intensity of LED will be adjusted by wide range, even with the small variation of the thyristor trigger phase angle in the external controller. The present invention features simple structure and low cost. It is able to generate good dimming effect without using complicated modems or wireless transmitters and receivers.

DETAILED DESCRIPTION

Figure 2:
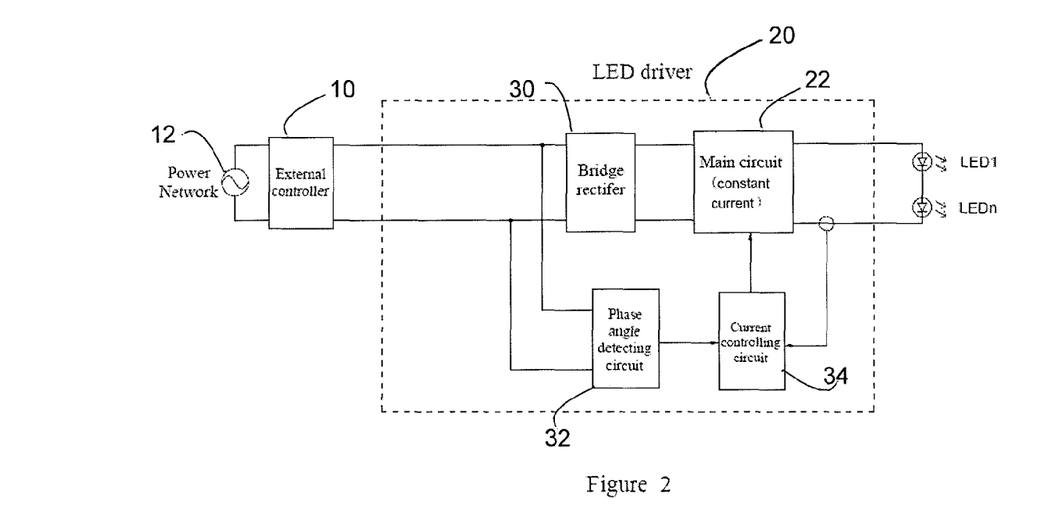
FIG. 2 is a block diagram of the LED drive circuit for SCR dimming circuit in the present invention.

As shown in FIG. 2, the LED drive circuit for the SCR dimming circuit comprises an external controller and an LED driver, and the LED driver comprises a bridge rectifier, a main circuit, a phase angle detecting circuit and a current controlling circuit in the present invention.

Figure 3:
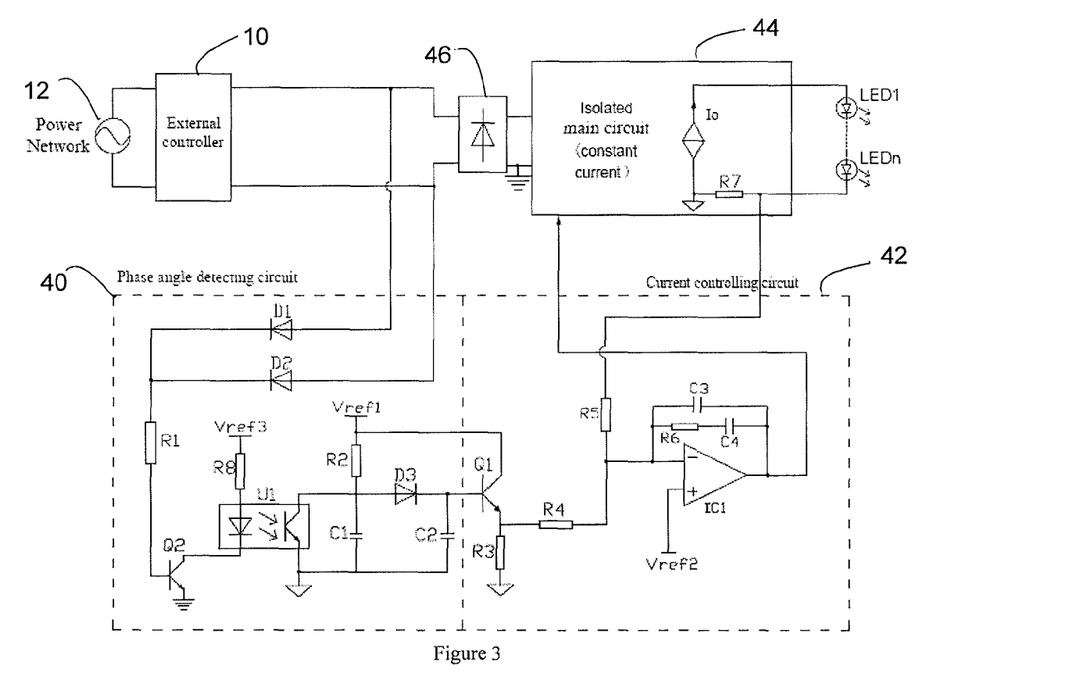
FIG. 3 is the first embodiment of the isolated LED drive circuit for SCR dimming circuit in the present invention.

In FIG. 3, the first embodiment comprises an isolated phase angle detecting circuit and an isolated current controlling circuit, and an isolated main circuit with constant current output. The input of the external controller is the power network, and the output of the external controller is the input of the bridge rectifier and the phase angle detecting circuit.

The phase angle detecting circuit consists of resistor R1, resistor R2, resistor R8, capacitor C1, capacitor C2, diode D1, diode D2, diode D3, transistors Q2 and optocoupler U1.

The anodes of D1 and D2 are connected to the two output ends of the external controller respectively. The cathodes of D1 and D2, and one end of R1 are connected. The other end of R1 is connected to the base of Q2, while the emitter of Q2 is connected to the power ground. The cathode of the LED in U1 is connected to the collector of Q2, while the anode of U1 is connected to one end of R8. The other end of R8 is connected to the Vref3 end of the third reference power supply. The collector of photistor in U1 is connected to the anode of D3, the ends of the R2 and C1. The other end of R2 is connected to the Vref1 end of the first reference power supply. The emitter of photistor in U1 is connected to the signal ground. The cathode of D3 is connected to one end of C2, while the other end of C2 is connected to the other end of C1 and the signal ground. The aforesaid circuit can detect and shape signal on the phase angle signal.

The current controlling circuit consists of resistor R3, resistor R4, resistor R5, resistor R6, resistor R7, capacitor C3, capacitor C4, transistors Q1, and integrated operational amplifier IC1.

The base of Q1 is connected to the cathode of D3 and one end of C2, the collector of Q1 is connected to the Vref1 end of the first reference power supply, and the emitter of Q1 is connected to one end each of R3 and R4. The other end of the R3 is connected to the signal ground, while the other end of R4 is connected to the negative input terminal of IC1, and one end each of R5, R6 and C3. The other end of R5 is connected to one end of R7, and the other end of R7 is connected to the signal ground. The positive input terminal of IC1 is connected to the Vref2 end of the second reference power supply. The other end of R6 is connected to one end of C4, while the other end of C4 is connected to the other end of C3 and the output terminal of IC1. The signal in the output terminal of IC1 is the current reference signal, and the output current of LED driver is controlled by the main circuit.

Figure 4:
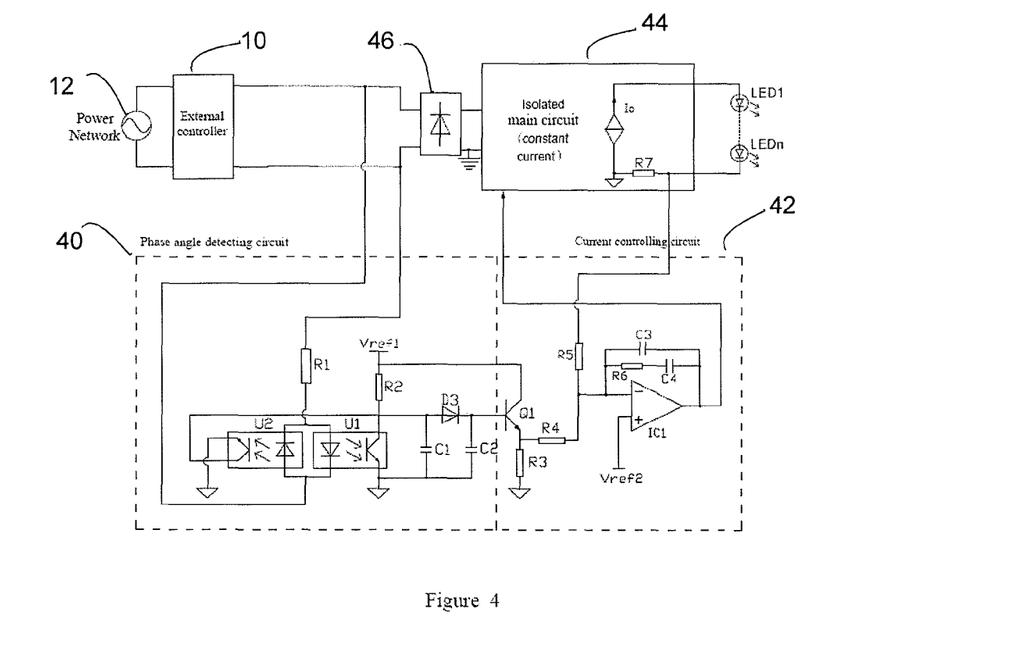
FIG. 4 is the second embodiment of the isolated LED drive circuit for SCR dimming circuit in the present invention.

In FIG. 4, the second embodiment comprises an isolated phase angle detecting circuit, an isolated current controlling circuit, and an isolated main circuit with constant current output. The input of the external controller is power network, and the output of which is the input from the bridge rectifier and the phase angle detecting circuit.

The phase angle detecting circuit consists of resistor R1, resistor R2, capacitor C1, capacitor C2, diode D3, transistors Q1, optocoupler U1 and optocoupler U2.

A branch consists of the LEDs in U1 and U2 using an anti-parallel connection, and R1 in series. The two ends of the branch are connected to the two output ends of the external controller respectively. The collectors of the photistors in U1 and U2 are connected together, and then connected to the anode of D3, the ends of R2 and C1. The other end of R2 is connected to the Vref1 end of the second reference power supply. The emitters of photistors in U1 and U2 are connected to the signal ground. The cathode of D3 is connected to one end of C2, while the other end of C2 is connected to the other end of C1 and the signal ground. The aforesaid circuit can detect and shape signal on the phase angle signal.

The current controlling circuit consists of resistor R3, resistor R4, resistor R5, resistor R6, resistor R7, capacitor C3, capacitor C4, transistor Q1, and integrated operational amplifier IC1.

The base of Q1 is connected to the cathode of D3 and one end of C2, the collector of Q1 is connected to the Vref1 end of the first reference power supply, and the emitter of Q1 is connected to one end each of R3 and R4. The other end of R3 is connected to the signal ground, while the other end of R4 is connected to the negative input terminal of IC1, one end each of R5, R6, and C3. The other end of R5 is connected to one end of R7, and the other end of R7 is connected to the signal ground. The positive input terminal of IC1 is connected to the Vref2 end of the second reference power supply. The other end of R6 is connected to one end of C4, while the other end of C4 is connected to the other end of C3 and the output terminal of IC1. The signal in the output terminal of IC1 is the current reference signal, and the output current of LED driver is controlled by the main circuit.

Figure 5:
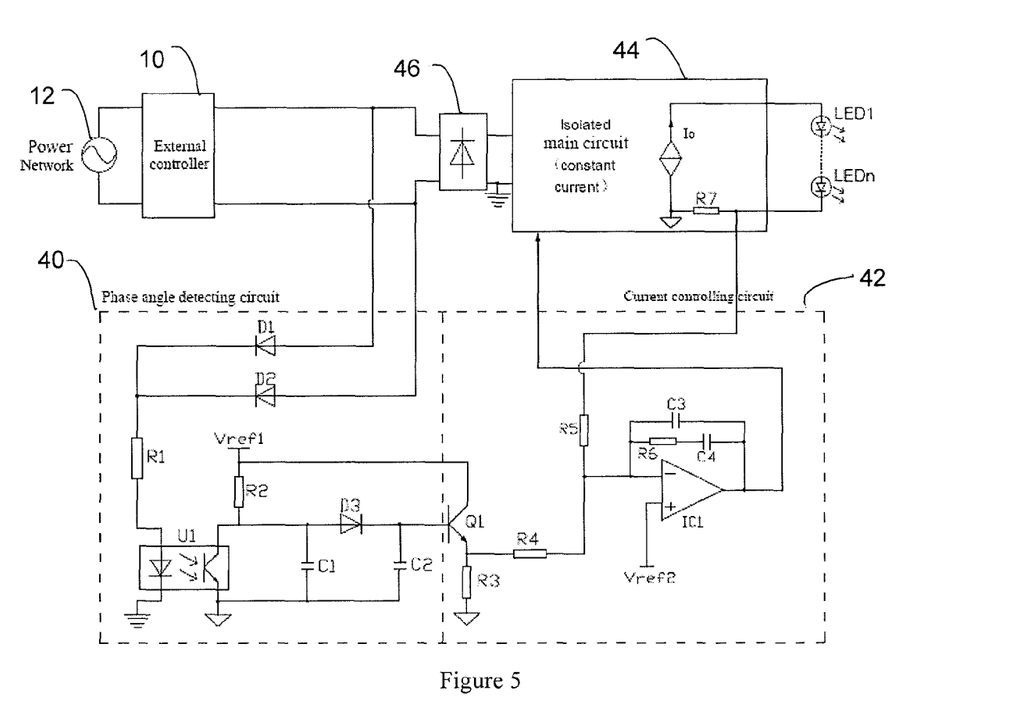
FIG. 5 is the third embodiment of the isolated LED drive circuit for SCR dimming circuit in the present invention.

In FIG. 5, the third embodiment comprises an isolated phase angle detecting circuit and an isolated current controlling circuit use isolated circuit, and an isolated main circuit with constant current output. The input of the external controller is power network, and the output of the external controller is the input of the bridge rectifier and the phase angle detecting circuit.

The phase angle detecting circuit consists of resistor R1, resistor R2, capacitor C1, capacitor C2, diode D1, diode D2, diode D3, optocoupler U1.

The anodes of D1 and D2 are connected to the two output ends of the external controller respectively. The cathodes of D1 and D2, and one end of R1 are connected. The other end of R1 is connected to the anode of the LED in U1. The cathode of the LED in U1 is connected to the power ground. The collector of the photistor in U1 is connected to the anode of D3, one end each of R2 and C1. The other end of R2 is connected to the Vref1 end of the first reference power supply. The emitter of photistor in U1 is connected to the signal ground. The cathode of D3 is connected to one end of C2, while the other end of C2 is connected to the other end of C1 and the signal ground. The aforesaid circuit can detect and shape signal on the phase angle signal.

The current controlling circuit consists of resistor R3, resistor R4, resistor R5, resistor R6, resistor R7, capacitor C3, capacitor C4, transistors Q1, and integrated operational amplifier IC1.

The base of Q1 is connected to the cathode of D3 and one end of C2, the collector of Q1 is connected to the Vref1 end of the first reference power supply, and the emitter of Q1 is connected to one end each of R3 and R4. The other end of R3 is connected to the signal ground, while the other end of R4 is connected to the negative input terminal of IC1, one end each of R5, R6, and C3. The other end of R5 is connected to one end of R7, and the other end of R7 is connected to the signal ground. The positive input terminal of IC1 is connected to the Vref1, end of the second reference power supply. The other end of R6 is connected to one end of C4, while the other end of C4 is connected to the other end of C3 and the output terminal of IC1. The signal in the output terminal of IC1 is the current reference signal, and the output current of LED driver is controlled by main circuit.

Figure 6:
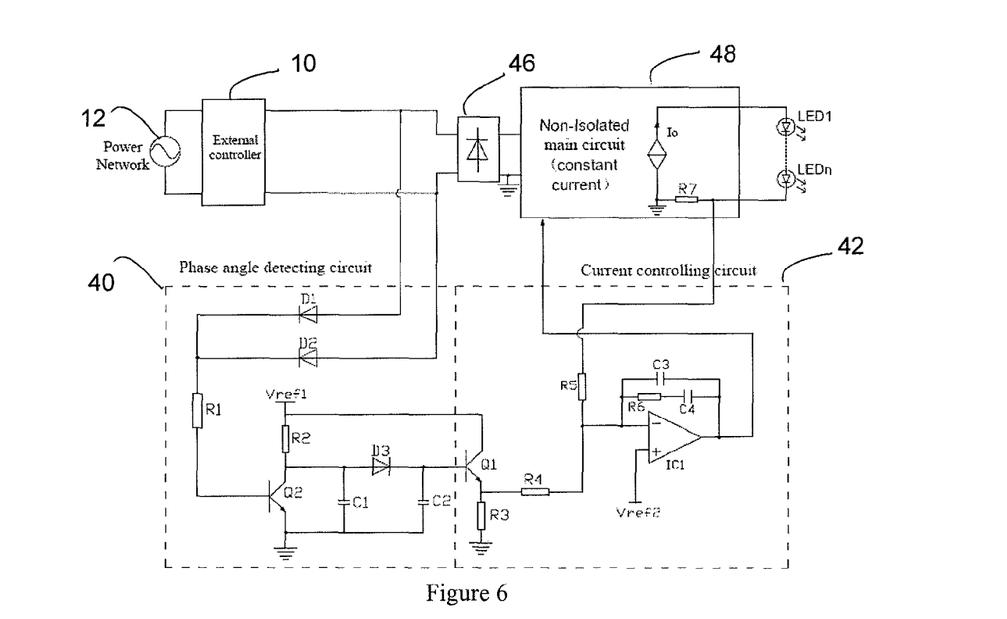
FIG. 6 is the first embodiment of the non-isolated LED drive circuit for SCR dimming circuit in the present invention.

In FIG. 6, the first embodiment comprises a non-isolated phase angle detecting circuit and a non-isolated current controlling circuit, and a non-isolated main circuit with constant current export. The input of the external controller is power network, and the output of the external controller is the input of the bridge rectifier and the phase angle detecting circuit.

The phase angle detecting circuit consists of resistor R1, resistor R2, capacitor C1, capacitor C2, diode D1, diode D2, diode D3, transistors Q2.

The anodes of D1 and D2 are connected to the two output ends of the external controller respectively. The cathodes of D1 and D2, and one end of R1 are connected. The other end of R1 is connected to the base of Q2, while the emitter of Q2 is connected to the ground. The collector of Q2 is connected to the anode of D3, one end each of R2 and C1. The other end of R2 is connected to the Vref1 end of the first reference power supply. The cathode of D3 is connected to one end of C2, while the other end of C2 is connected to the other end of C1 and the ground. The aforesaid circuit can detect and shape signal on the phase angle signal.

The current controlling circuit consists of resistor R3, resistor R4, resistor R5, resistor R6, resistor R7, capacitor C3, capacitor C4, transistors Q1, and integrated operational amplifier IC1.

The base of Q1 is connected to the cathode of D3 and one end of C2, the collector of Q1 is connected to the Vref1 end of the first reference power supply, and the emitter of Q1 is connected to the ends of R3 and R4. The other end of R3 is connected to the ground, while the other end of R4 is connected to the negative input terminal if IC1, the ends of R5, R6, and C3. The other end of R5 is connected to one end of R7, and the other end of R7 is connected to the ground. The positive input terminal of IC1 is connected to the Vref2 end of the second reference power supply. The other end of R6 is connected to one end of C4, while the other end of C4 is connected to the other end of C3 and the output terminal of IC1. The signal in the output terminal of IC1 is the current reference signal, and the output current of the LED driver is controlled by the main circuit.

Figure 7:
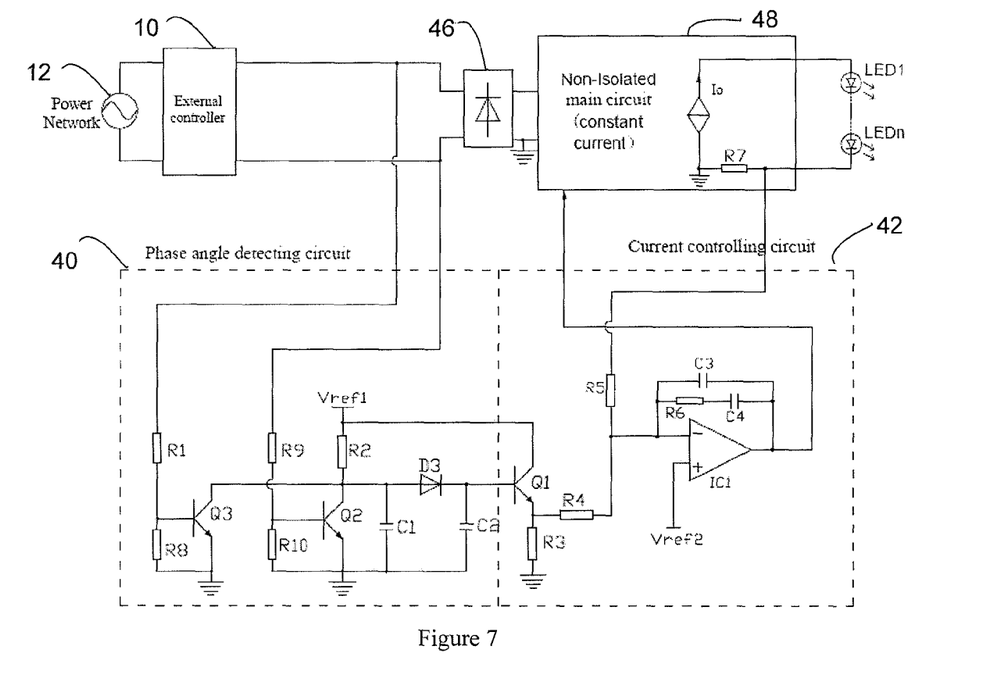
FIG. 7 is the second embodiment of the non-isolated LED drive circuit for SCR dimming circuit in the present invention.

In FIG. 7, the second embodiment comprises a non-isolated phase angle detecting circuit and a non-isolated current controlling circuit, and a non-isolated main circuit with constant current output. The input of the external controller is power network, and the output of the external controller is the input of the bridge rectifier and the phase angle detecting circuit.

The phase angle detecting circuit consists of resistor R1, resistor R2, resistor R8, resistor R9, resistor R10, capacitor C1, capacitor C2, diode D3, transistors Q2, and transistors Q3.

The ends of R1 and R9 are connected to the two output ends of the external controller respectively. The other end of R1 is connected to the base of Q3 and one end of R8, while the other end of R9 is connected to the base of Q2 and one end of R10. The other ends of R8 and R10, and the emitters of Q3 and Q2 are connected to the ground. The collectors of Q2 and Q3 are connected to the anode of D3, one end each of R2 and C1. The other end of R2 is connected to the Vref1 end of the first reference power supply. The cathode of D3 is connected to one end of C2, while the other end of C2 is connected to the other end of C1 and the ground. The aforesaid circuit can detect and shape signal on the phase angle signal.

The current controlling circuit consists of resistor R3, resistor R4, resistor R5, resistor R6, resistor R7, capacitor C3, capacitor C4, transistors Q1, and integrated operational amplifier IC1.

The base of Q1 is connected to the cathode of D3 and one end of C2, the collector of Q1 is connected to the Vref1 end of the first reference power supply, and the emitter of Q1 is connected to one end each of R3 and R4. The other end of R3 is connected to the ground, while the other end of R4 is connected to the negative input terminal of IC1, one end each of R5, R6, and C3. The other end of R5 is connected to one end of R7, and the other end of R7 is connected to the ground. The positive input terminal of IC1 is connected to the Vref2 end of the second reference power supply. The other end of R6 is connected to one end of C4, while the other end of C4 is connected to the other end of C3 and the output terminal of IC1. The signal in the output terminal of IC1 is the current reference signal, and the output current of LED driver is controlled by main circuit.

Figure 8:
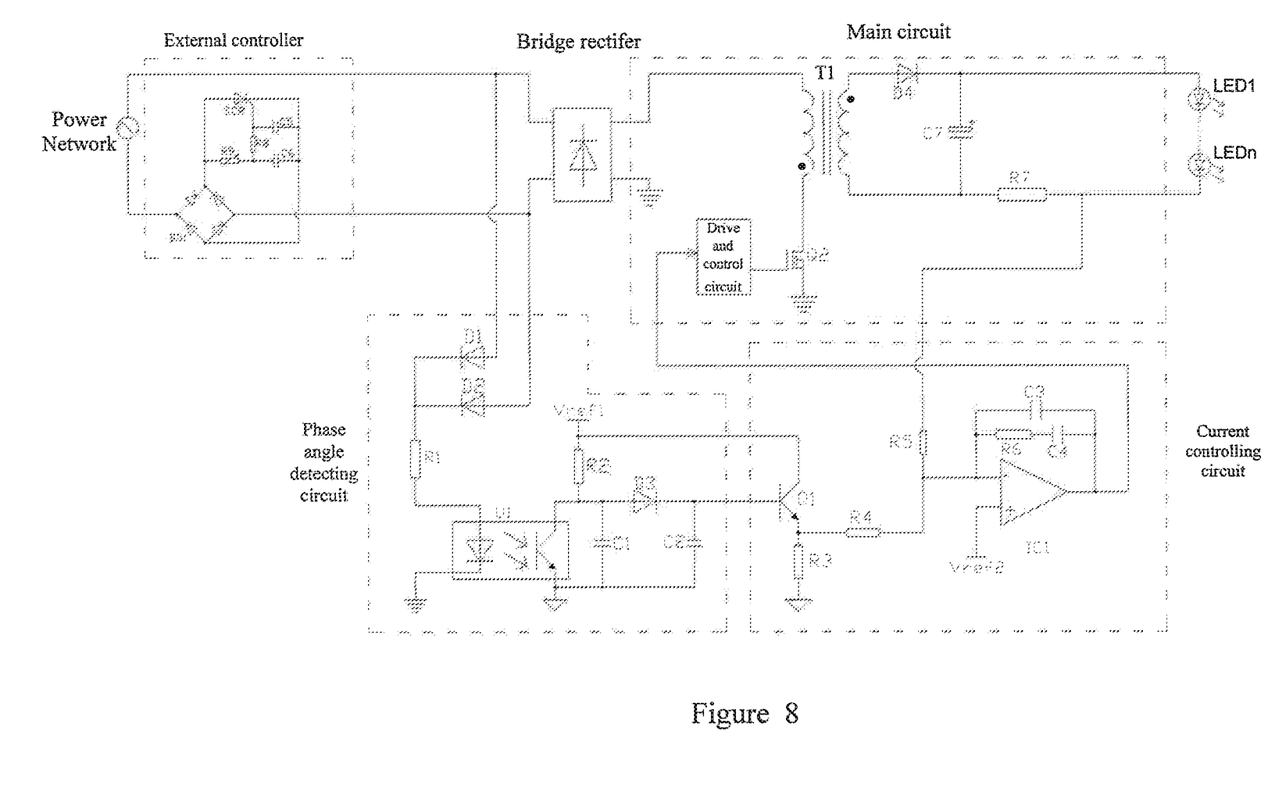
FIG. 8 is a typical schematic diagram based on the third embodiment of the isolated LED drive circuit for SCR dimming circuit in the present invention.

FIG. 8 is a typical schematic diagram based on the third embodiment of the isolated LED drive circuit for SCR dimming circuit in the present invention. A detailed introduction is as following: The input of external controller is power network. The external controller comprises thyristor SCR, bridge rectifier BD1, resistors R8, variable resistors R9, capacitor C5, and capacitor C6. The AC input terminal of bridge rectifier BD1 is connected to the null line, the positive output terminal of it is connected to the anode of the thyristor SCR and one end of the variable resistor R9, the negative output terminal of it is connected to the cathodes of the thyristor SCR and the ends of the capacitor C5 and capacitor C6. The other end of the capacitor C6 is connected to the other end of the resistor R9 and one end of the resistor R8. The other end of the capacitor C5 is connected to the other end of the resistor R8 and the gate of the thyristor SCR. The output of the external controller is the input of the bridge rectifier and the phase angle detecting circuit.

The phase angle detecting circuit and the current controlling circuit are exactly the same as that shown in FIG. 5.

The topology of the main circuit is FLYBACK. The main circuit comprises transformer T1, MOSFET Q2 with drive circuit, diode D4, output electrolytic capacitor C7, and resistor R7. The dotted terminal of primary winding of the transformer T1 is connected to the drain of the MOSFET Q2. The source of the MOSFET Q2 is connected to the power ground, and the gate of the MOSFET Q2 is connected to the drive circuit of the MOSFET. The dotted terminal of secondary winding of the transformer T1 is connected to the anode of the diode D4, and the cathodes of diode D4 is connected to the positive terminal of the electrolytic capacitor C7, and the positive output terminal of the main circuit. The negative terminal of the electrolytic capacitor C7 is connected to one end of the resistors R7, and the other end of the resistors R7 is connected to the negative output terminal of the main circuit.

Finally, it should be understood that the above mentioned embodiments are just the illumination of the present invention, but not limited to the invention. All extended solutions or substitutions based on the principle and content of this invention should be regarded as Inventors' claims to be protected.

What is claimed:

1. A LED drive circuit for SCR dimming comprising:
an external controller configured to convert AC voltage from a power network to AC voltage with a lacked phase by phase controlling the voltage through a thyristor; and
a LED driver comprising:
a bridge rectifier configured to shape the AC voltage with the lacked phase output into a unidirectional pulse DC voltage, and deliver the pulse DC voltage to a main circuit;
a current controlling circuit which comprises a current detecting signal outputted from the main circuit and a controlling signal output from the phase angle detecting circuit, and wherein the current controlling circuit outputs a current reference signal to the main circuit to control and adjust the current;
a main circuit configured to receive the pulse DC voltage signal output from bridge rectifier and a current reference signal output from a current detecting circuit, and after being modulated by a pulse width modulation circuit further configured to convert its voltage and output DC voltage to a LED load and a current detecting signal to a current controlling circuit; and
a phase angle detecting circuit configured to shape the AC voltage signal output with the lacked phase from the external controller into a saw-tooth wave pulse signal, whose peak value changes according to a variation of thyristor trigger phase angle wherein the saw-tooth voltage signal is converted to a level signal, which changes in proportion to a peak variation of the saw-tooth wave pulse signal, and then outputs the level signal to the current controlling circuit as the output controlling signal from the phase angle detecting circuit.

2. The LED drive circuit according to claim 1, wherein the main circuit can control the constant current and adjust the output current to regulate the output current and adjust the illumination intensity of the LED, and wherein the phase angle detecting circuit and the current controlling circuit are isolated circuits.

3. The LED drive circuit according to claim 2, wherein the phase angle detecting circuit comprises a first resistor, a second resistor, a third resistor, a first capacitor, a second capacitor, a first diode, a second diode, a third diode, a transistor, and an optocupler.

4. The LED drive circuit according to claim 3, wherein the anodes of a first diode and second diode are connected to output ends of the external controller, cathodes of the first diode and the second diode and one end of the first resistor are connected, a second end of the first resistor is connected to a base of the first transistor while an emitter end of the first transistor is connected to a power ground, the cathode of the light emitting diode in the optocoupler is connected to a collector end of a first transistor, an anode of the optocoupler is connected to one end of the third resistor, the other end of third resistor is connected to a reference power supply, a collector of a photistor in the optocoupler is connected to an anode of the third diode, a first end of the second resistor and a first end of the first capacitor, a second end of second resistor is connected to the reference power supply, an emitter of the photistor in the optocupler is connected to a signal ground, a cathode of the third diode is connected to a first end of second capacitor, while the second end of second capacitor is connected to the second end of first capacitor, and the signal ground.

5. The LED drive circuit according to claim 4, wherein the phase angle detecting circuit is configured to detect and shape a signal on the phase angle signal.

6. The LED drive circuit according to claim 5, wherein the current controlling circuit further comprises a third resistor, a fourth resistor, a fifth resistor, a sixth resistor, a seventh resistor, a third capacitor, a fourth capacitor, a first transistor, and an integrated operational amplifier.

7. The LED drive circuit according to claim 6, wherein a base of the first transistor is connected to a cathode of the third diode and one end of the second capacitor, a collector of the transistor is connected to an end of the reference power supply, an emitter of transistor is connected to one end each of the third resistor and the fourth resistor, a second end of the third resistor is connected to the signal ground, a second end of the fourth resistor is connected to a negative input terminal of the integrated operational amplifier and to one end each of the fifth resistor, sixth resistor and the third capacitor, a second end of the fifth resistor is connected to a first end of seventh resistor, a second end of the seventh resistor is connected to the signal ground, a positive input terminal of the integrated operational amplifier is connected to an end of a second reference power supply, a second end of the sixth resistor is connected to one end of the fourth capacitor, and a second end of fourth capacitor is connected to a second end of the third capacitor and an output terminal of integrated operational amplifier.

8. The LED drive circuit according to claim 7, wherein a signal from the output terminal of integrated operational amplifier is a current reference signal, and the output current of LED driver is controlled by the main circuit.

9. The LED drive circuit according to claim 1, wherein the phase angle detecting circuit consists of a first resistor, a second resistor, a first capacitor, a second capacitor, a third diode, first transistor, a first optocoupler and a second optocoupler.

10. The LED drive circuit according to claim 9, wherein a branch is formed comprising consists an LED in the first optocoupler and an LED in the second optocouler having an anti-parallel connection, and the first resistor in series; a first and second ends of the branch connected to the respective output ends of the external controller; collectors of the each photistor are connected together, and then connected to an anode of the third diode, an end of the second resistor and an end of the first capacitor; a second end of the second resistor is connected to an end of the second reference power supply; emitters of the photistors connected to the signal ground; a cathode of the third diode connected to one end of the second capacitor while a second is connected to a second end of the first capacitor and to the signal ground.

11. The LED drive circuit according to claim 10, wherein the current controlling circuit comprises the third resistor, the fourth resistor, the fifth resistor, the sixth resistor, the seventh resistor, the third capacitor, the fourth capacitor, the first transistor, and the integrated operational amplifier.

12. The LED drive circuit according to claim 11, wherein the base of first transistor is connected to the cathode of the third diode and one end of the second capacitor, the collector of integrated operational amplifier is connected to an end of the first reference power supply, and the emitter of the transistor is connected to one end each of the third resistor and the fourth resistor; the second end of the third resistor is connected to the signal ground; a second end of the fourth resistor is connected to the negative input terminal of the integrated operational amplifier, one end each of the fifth resistor, sixth resistor and the third capacitor; a second end of the fifth resistor is connected to one end of the seventh resistor, and a second end of the seventh resistor is connected to the signal ground; a positive input terminal of the integrated operational amplifier is connected to an end of a second reference power supply; and a second end of the sixth resistor is connected to one end of the fourth capacitor while a second end of the fourth capacitor is connected to a second end of the third capacitor and to an output terminal of the integrated operational amplifier.

13. The LED drive circuit for SCR dimming as claimed in claim 1, wherein the phase angle detecting circuit comprises a first resistor, second resistor, first capacitor, second capacitor, first diode, second diode, third diode, and an optocoupler.

14. The LED drive circuit according to claim 13, wherein anodes of the first diode and the second diode are connected individually to a respective separate one of output ends of the external controller; cathodes of the first diode and the second diode and a first end of the first resistor are connected; a second end of the first resistor is connected to an anode of a LED in the optocoupler; a cathode of the LED in optocoupler is connected to the power ground; a collector of the photistor in the optocoupler is connected to an anode of the third diode one end each of the second resistor and the first capacitor; a second end of second resistor is connected to an end of the first reference power supply; an emitter of the photistor in the optocoupler is connected to the signal ground; and a cathode of the third diode is connected to one end of the second capacitor while the other end of second capacitor is connected to a second end of the first capacitor and the signal ground.

15. The LED drive circuit according to claim 14, wherein the current controlling circuit consists of a third resistor, a fourth resistor, a fifth resistor, a sixth resistor, a seventh resistor, a third capacitor, fourth capacitor, a transistor, and an integrated operational amplifier, wherein a base of the transistor is connected to a cathode of third diode and a first end of the second capacitor, a collector of the transistor is connected to an end of the first reference power supply, and an emitter of transistor is connected to a first end of the third resistor and a first end of the fourth resistor; a second end of the third resistor is connected to the signal ground, while a second end of the fourth resistor is connected to a negative input terminal of the integrated operational amplifier, a first end of the fifth resistor, a first end of a sixth resistor, and a first end of the third capacitor; a second end of the fifth resistor is connected to a first end of the seventh resistor, and a second end of the seventh resistor is connected to the signal ground; a positive input terminal of the integrated operational amplifier is connected to one end of the second reference power supply; a second end of the sixth resistor is connected to a first end of the fourth capacitor, while a second end of the fourth capacitor is connected to a second end of the third capacitor and an output terminal of the integrated operational amplifier; wherein the signal in the output terminal of integrated operational amplifier is the current reference signal, and the output current of the LED driver is controlled by the main circuit.

16. The LED drive circuit for SCR dimming as claimed in claim 1, wherein the phase angle detecting circuit and the current controlling circuit are non-isolated circuits and the main circuit is a non-isolated circuit with constant current output, wherein the phase angle detecting circuit further comprises a first resistor, a second resistor, a first capacitor, a second capacitor, a first diode, a second diode, a third diode, and a second transistor, and further wherein anodes of the first diode and the second diode are connected to two output ends of the external controller respectively; cathodes of the first diode and the second diode, and a first end of the first resistor are connected; a second end of the first resistor is connected to a base of the second transistor while a emitter end of the second transistor is connected to ground; a collector of the second transistor is connected to an anode of the third diode, one end each of the second resistor and the first capacitor; a second end of the second resistor is connected to an end of the first reference power supply; and a cathode of the third diode is connected to one end of the second capacitor while the other end of second capacitor is connected to the other end of first capacitor and to ground.

17. The LED drive circuit for SCR dimming as claimed in claim 16, wherein the current controlling circuit consists of a third resistor, a fourth resistor, a fifth resistor, a sixth resistor, a seventh resistor, a third capacitor, a fourth capacitor, a transistor, and an integrated operational amplifier, wherein a base of the transistor is connected to a cathode of the third diode and one end of the second capacitor, a collector of transistor is connected to one end of the first reference power supply, and an emitter of transistor is connected to one end of third resistor and the fourth resistor; a second end of the third resistor is connected to ground, while a second end of the fourth resistor is connected to a negative input terminal of the integrated operational amplifier, one end of the first resistor, one end of the sixth resistor, and one end of the third capacitor; A second end of the fifth is connected to one end of the seventh resistor, and a second end of the seventh resistor is connected to ground; a positive input terminal of the integrated operational amplifier is connected to one end of the second reference power supply; a second end of the sixth resistor is connected to one end of the fourth capacitor while a second end of fourth capacitor is connected to a second end of the third capacitor and an output terminal of the integrated operational amplifier; and wherein a signal in the output terminal of integrated operational amplifier is a current reference signal, and an output current of the LED driver is controlled by the main circuit.

18. The LED drive circuit for SCR dimming as claimed in claim 17, wherein the phase angle detecting circuit consists of first resistor, a second resistor, an eighth resistor, a ninth resistor, a tenth resistor, a first capacitor, a second capacitor, a third diode, a second transistor, and a third transistor wherein ends of the first resistor and the ninth resistor are connected to respective different two output ends of the external controller; a second end of the first resistor is connected to a base of the third transistor and one end of the eight resistor while a second end of the ninth resistor is connected to a base of the second resistor and a first end of the tenth resistor; a second end of the eighth resistor and the tenth resistor and emitters of the third transistor and the second transistor are connected to the ground; collectors of second transistor and the third transistor are connected to an anode of the third diode, one end each of the second resistor and the first capacitor; and a second end of second resistor is connected to one end of the first reference power supply; and a cathode of the third diode is connected to one end of the second capacitor while a second end of the second capacitor is connected to a second end of the first capacitor and to ground.

19. The LED drive circuit for SCR dimming as claimed in claim 18, wherein the current controlling circuit comprises of a third resistor, a fourth resistor, a fifth resistor, a sixth resistor, a seventh resistor, a third capacitor, a fourth capacitor, a first transistor, and an integrated operational amplifier wherein a base of first transistor is connected to a cathode of the third diode and one end of the third capacitor, a collector of first transistor is connected to one end of the first reference power supply, and an emitter of the transistor is connected to one end each of third resistor and the fourth resistor; a second end of third resistor is connected to ground while a second end of the fourth resistor is connected to a negative input terminal of the integrated operational amplifier, one each of the fifth resistor, sixth resistor, and the third capacitor; a second end of the fifth resistor is connected to one end of the seventh resistor and a second other end of the seventh resistor is connected to ground; a positive input terminal of the integrated operational amplifier is connected to one end of the second reference power supply; a second end of the sixth resistor is connected to one end of the fourth capacitor while a second end of the fourth capacitor is connected to a second end of the third capacitor and an output terminal of the integrated operational amplifier; and wherein a signal in an output terminal of the integrated operational amplifier is the current reference signal, and an output current of LED driver is controlled by main circuit.

* * * * *